3,050,344
CONTROL VALVE
Osborn A. Kershner, St. Joseph, Mich., assignor, by mesne assignments, to Lambert Brake Corporation, St. Joseph, Mich., a corporation of Michigan
Filed Mar. 1, 1961, Ser. No. 92,608
3 Claims. (Cl. 303—54)

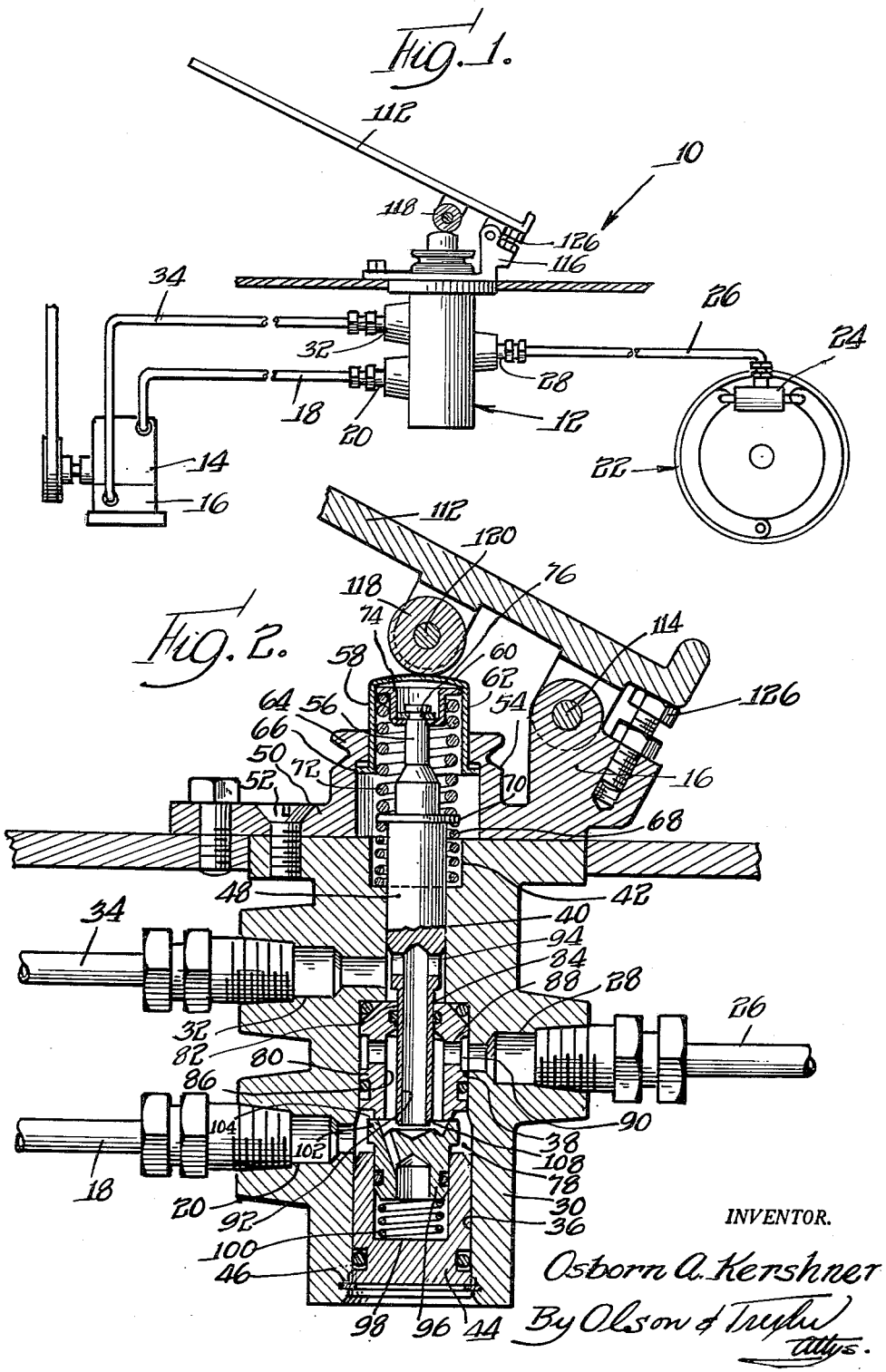

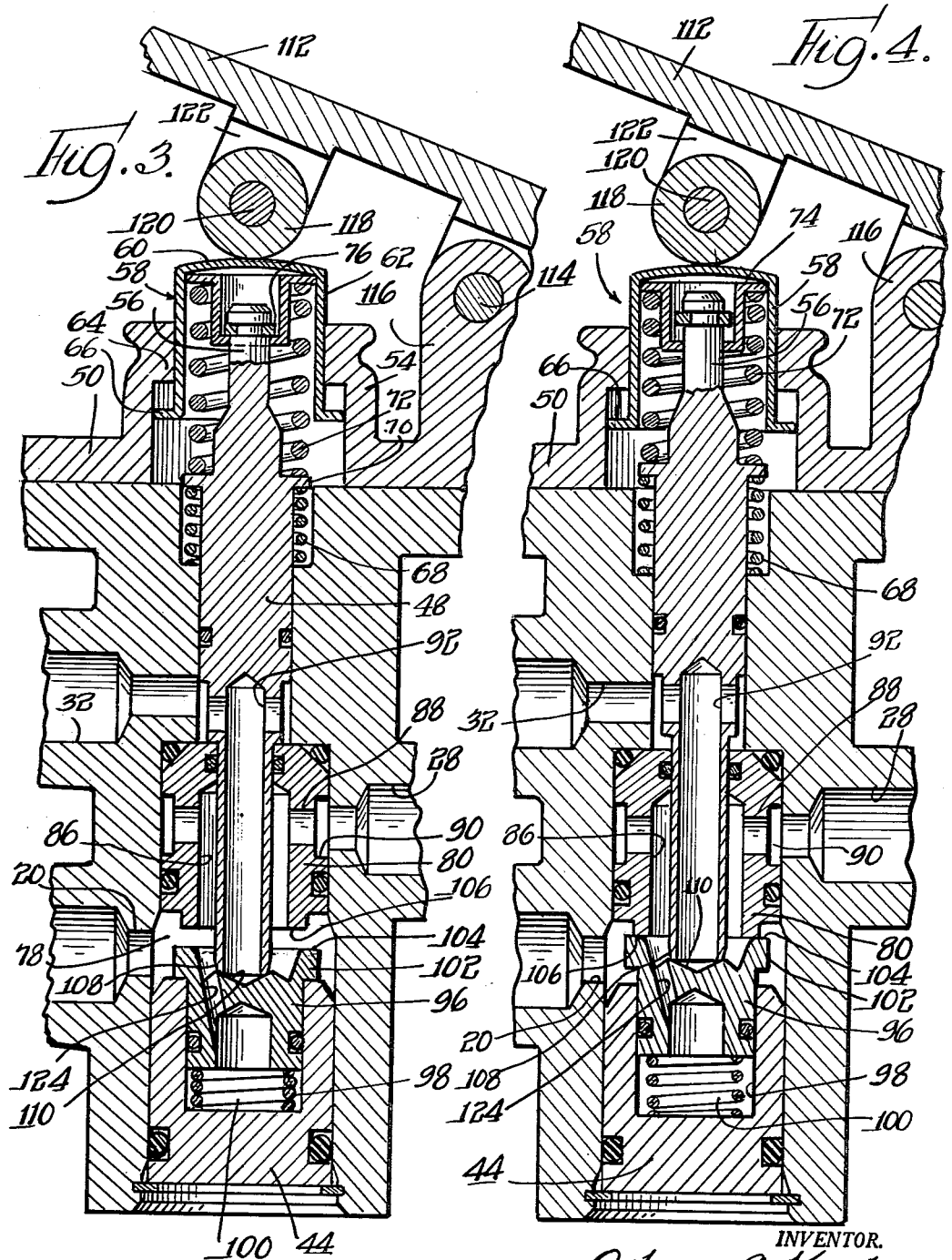

The present invention relates to a novel control valve, and more specifically to a novel valve for controlling the operation of a fluid pressure actuated system such as brakes, clutches and the like.

One important factor in the provision of a desirable fluid or hydraulic pressure operated brake system in vehicles and the like is a construction whereby an operator is provided with a "feel" for facilitating proper operation of the system. In other words, it is important that provisions be made to enable an operator to judge the force with which the brakes are being applied.

An important object of the present invention is to provide a novel control valve for a fluid pressure operated system, which valve is constructed so as to provide a resistance to manipulation by an operator or a "feel" which is proportional to the amount of pressure being utilized for operating the system.

A further object of the present invention is to provide a novel control valve structure of the above type which is of relatively simple and rugged construction and which is smooth and efficient in operation.

Other objects and advantages of the present invention will become apparent from the following description and the accompanying drawings wherein:

FIG. 1 is an elevational view showing a brake system incorporating a control valve embodying features of the present invention;

FIG. 2 is a partial vertical sectional view of the control valve shown in FIG. 1;

FIG. 3 is an enlarged fragmentary sectional view showing the control valve in an opened condition; and FIG. 4 is a view similar to FIG. 3 but shows the control valve in another condition which results during operation of the brake system.

Referring now more specifically to the drawings wherein like parts are designated by the same numerals throughout the various figures, a system 10 is shown in FIG. 1 which incorporates a control valve 12 constructed in accordance with features of the present invention. The system 10 also comprises a high pressure pump 14 connected with a suitable reservoir 16 and having a discharge high pressure line 18 connected with an inlet 20 of the valve 12. The system further includes a brake unit 22 which may be of known construction. The brake unit includes an actuating cylinder 24 connected by a conduit 26 with a port 28 of the valve 12.

The valve 12 comprises a body member 30 having the above mentioned ports 20 and 28 therein. An additional port 32 is formed in the body member 30 and this port is connected by means of an exhaust conduit 34 to the reservoir 16.

An axially extending bore 36 is formed in one end portion of the body member 30 and communicates with an axially aligned slightly reduced diameter bore 38 in a midportion of the body member. The bore 38 merges with a further reduced diameter axially aligned bore 40 which extends toward an end of the body member 30 and merges with a counterbore 42. One end of the axially extending bore means provided by the bores 36, 38, 40 and 42 is closed by a plug 44 secured within an end of the bore 36 by a snap ring 46 or any other suitable means. A valve stem 48 is axially disposed in the bore means and has an end portion extending outwardly of an end of the bore means disposed oppositely from the plug 44.

A complementary valve body member 50 is detachably secured to an end of the body member 30 by screws 52 or other suitable means, and the complementary body member is provided with an upstanding annular portion 54 surrounding an outer end portion of the valve stem 48. The reduced diameter outer end portion 56 of the valve stem extends outwardly through the annular portion 54 of the complementary body member but is covered by a cap 58 having a rounded top wall 60 and a cylindrical side wall 62 which is axially slidably disposed within an open end of the annular portion 54 of the complementary body 50. The annular body portion 54 and the cylindrical wall 62 of the cap are respectively formed with opposed annular flanges 64 and 66 which are engageable with each other for positively limiting outward movement of the cap.

The valve stem 48 is normally maintained in a raised or outwardly shifted position shown in FIG. 2 by a compression spring 68 which is disposed between the bottom of the counterbore 42 and a radially extending flange 70 on the stem. An additional compression spring 72 is disposed between an opposite side of the flange 70 and a flange of a spring retainer 74 located adjacent the outer terminal end of the valve stem for a purpose to be described fully below. The spring retainer 74 is axially slidable on the reduced diameter outer end portion 56 of the valve stem so that the valve stem may shift axially relative to the spring retainer 74 and the cap member 58 in the manner and for the purpose described below. A snap ring or other suitable abutment 76 is provided for positively limiting outward movement of the spring retainer 74 relative to the valve stem.

As shown in FIGS. 2, 3 and 4, the inlet port 20 communicates with an annular chamber 78 within the bore 36, which chamber is disposed bewteen the plug 44 and an insert 80 disposed within the bore 38. The insert is provided with a central bore 82 through which a lower end portion 84 of the valve stem 48 slidably extends. The insert is further provided with an enlarged counterbore 86 which communicates with the chamber 78. Lateral passageways 88 extend from the bore 86 to an annular manifold 90 formed in the outer surface of the insert 80, which manifold communicates with the outlet port 28.

As shown in the drawings, the lower end portion 84 of the valve stem 48 is provided with an axially extending passageway 92, therein, which passageway communicates with the exhaust port 32 through a transverse passageway 94 which traverses the valve stem and commnuciates with a portion of the bore 40 which is intersected by the exhaust port 32.

A valve element 96 is axially shiftably disposed in the chamber 78. One end portion of the valve element 96 extends into and is axially shiftable within a bore 98 formed in the inner end of the plug member 44 so that the valve element is guided and maintained in axial alignment with the valve stem 48. A compression spring 100 is disposed between the valve element 96 and an end of the bore 98 for resiliently urging the valve element toward a raised or closed position shown in FIGS. 2 and 4.

The valve element 96 is provided with an annular radially outwardly projecting flange 102 at its upper or inner end, which flange presents an axially facing flat valve surface 104 for sealing engagement with a flat annular valve seat 106 (FIG. 3) provided on the insert 80 around the mouth of the passageway or bore 86. It is apparent that when the valve element is in engagement with the seat 106, flow of fluid through the inlet port 20 and the inlet chamber 78 will be blocked.

A clearance is provided between the lower or innermost end 108 of the valve stem 48 and the upper end of the valve element 96 when the valve stem is in its raised or retracted position. Thus, the passageway 92 within the valve stem is in communication with the passageway 86 and the port 28 so that the actuating cylinder 24 of the brake structure is connected with the exhaust or drain line 34.

The lower end 108 of the valve stem 48 is beveled in the manner shown so as to provide a valve surface. The valve element 96 is provided with a centrally located inverted conical valve seat 110 which is spaced radially within the valve surface 104 of the element 96 and which is cooperable with the end 108 of the valve stem. In order to open the valve structure, the valve stem 48 is depressed in a manner which will be described in detail below. During initial movement of the valve stem 48, the gap between the end 108 of the valve stem and the valve seat 110 of the valve element 96 is closed so that the exhaust passageway of the valve structure is sealed. Further, downward movement of the valve stem 48 forces the element 96 away from the valve seat 106 as shown in FIG. 3 for establishing communication between the inlet and outlet ports 20 and 28 respectively and energizing the brake structure.

Suitable means is provided for depressing the valve stem 48 to open the valve structure. In the embodiment shown for the purpose of illustrating the invention, this means comprises a foot pedal 112 pivotally connected by a pin 114 to an upstanding bracket portion 116 of the complementary body member 50. A roller 118 is mounted on a pin 120 extending between ears 122 depending from the pedal for engaging the cap member 58. As indicated above, the upper end 60 of the cap member is rounded or dome shaped for engagement with the roller 118 in the manner which promotes rolling contact and therefore smooth and uniform operation of the structure.

As previously mentioned, one important feature of the valve structure is a construction whereby an operator will be provided with the desired "feel" for facilitating proper operation of the brake or other mechanism control by the valve structure. In this connection, it is to be noted that the valve element 96 is provided with a small passageway 124 extending generally axially therethrough between the valve surfaces 104 and 110. This enables the bore 98 to be filled with fluid behind the piston like valve element 96, which fluid will assume the pressure of fluid entering the passageway 86 and communicating with the brake actuating cylinder during operation of the brake structure. In addition it is to be noted that when the valve is opened as shown in FIG. 3, the valve stem end 108 covers a substantial central area of the upper or inner end of the valve element 96 which area is exposed to the drain or exhaust port. As a result, the total area of the upper or inner end of the valve element 96 which is exposed to fluid under pressure is substantially reduced and is less than the total area of the lower or outer end of the valve element, including the under surface of the flange 102. Thus, as hydraulic pressure builds up within the bore 98 behind the valve element, the pressure combines with the springs 68 and 100 and urges the valve element 96 and the valve stem 48 toward the position shown in FIG. 4 in which the valve element is closed. When the valve element 96 is closed in this manner, further delivery of fluid under pressure from the high pressure pump 14 is prevented so as to preclude an over application of the brake unit 22.

When the valve stem 48 and the valve element 96 shift from the open position shown in FIG. 3 to the closed position shown in FIG. 4 during operation of the brake system, the foot pedal 112 will normally be held in a substantially fixed position by the operator. Thus, the cap member 58 and spring retainer 74 will be held in a substantially fixed position so that the valve stem 48 will shift axially relative thereto as shown in FIG. 4. As a result, the spring 72 will be progressively compressed and the reaction force which is felt by the operator will increase. The magnitude of this force is directly related to the pressure of the fluid delivered for actuating the brake unit 22 so that the "feel" provided by the reaction force indicates to the operator the pressure which is being utilized to energize the brake unit.

Operation of the brake system 10 may be accomplished in the following manner. The width of the gap or clearance between the end of the valve stem 48 and valve element 96 fixed by the normal or retracted position of the foot pedal 112 is first adjusted by means of an adjustable abutment or stop element 126 which is mounted on the complementary body member 50 for engagement with one end of the pedal as shown in FIGS. 1 and 2. In addition, the pump 14 is continuously driven from the engine of an automobile or by any other suitable means so that a source of fluid under a relatively high pressure is continuously provided. Since circulation of fluid through the valve 12 is blocked when the valve parts are in the retracted or closed position shown in FIG. 2, the pump 14 may be provided with suitable built-in pressure relief valve means in a known manner for recirculating fluid to the reservoir.

When it is desired to energize the brake unit 22, the foot pedal 112 is pressed downwardly by an operator in the usual manner. Upon an initial application of the brake, the pedal may be depressed from its fully raised position shown in FIGS. 1 and 2 to a partially lowered position shown in FIG. 3 and this action forces the valve stem 48 downwardly so that it in turn engages the valve element 96 and shifts the valve element 96 to an opened position as shown in FIG. 3. It will be appreciated that prior to opening of the valve element 96, the passageway 86 is substantially relieved of all fluid pressure since it is in communication with the exhaust port 32 and therefore the fluid within the bore 98 and behind the piston-like valve element 96 is also relieved of pressure.

Prior to the opening of the valve element 96, the exhaust port is blocked or closed by the seal between the valve surface 108 and the valve surface 110 in the manner described above. Therefore, upon opening of the valve element 96, the fluid under pressure flows from port 20 through the chamber 78 and ultimately through the outlet port 28 to the brake cylinder 24.

As the brake cylinder 24 is actuated and the fluid pressure builds up in the system and particularly in the vicinity of the passageway 124 in the valve element 96, fluid under pressure is transmitted through the passageway 124 so that the pressure behind the valve element 96 also builds up or progressively increases in accordance with the pressure transmitted to the brake cylinder and the degree with which the brake unit is energized. As a result of the differential piston effect which is created when the end 108 of the valve stem 48 is sealed against the end of valve element 96, the valve element 96 rises or returns toward its closed position as the pressure builds up within the bore 98. The operator continues to hold the foot pedal 112 in the partially depressed position of FIG. 3, the valve element 96 and the valve stem 48 will move upwardly relative to the cap member 58 and the spring retainer 74 as shown in FIG. 4 until the valve element 96 is fully closed. This action causes the spring 72 to be compressed as shown in FIG. 4, which spring is substantially stronger and heavier than the springs 68 and 100 combined. When the valve element 96 is fully closed as shown in FIG. 4 the resistance or back pressure felt by the operator comprises the upward force on the cap member 58 provided by the partially compressed spring 72 and, as previously indicated, the degree to which this spring is compressed is related to the fluid pressure developed behind the valve element 96 and thus the fluid pressure applied for energizing the brake unit.

It will be appreciated that after the brake pedal has been partially depressed and the valve element 96 has closed as shown in FIG. 4, it may be desired to apply additional fluid pressure to the brake cylinder 24 for more aggressively energizing the brake unit. This may readily be accomplished by further depressing the foot pedal 112. The force from the foot pedal is transmitted through the cap member 58, the spring retainer 74 and the spring 72 to the valve stem. When the additional force applied by the operator is sufficient to overcome the force provided by the fluid pressure holding the valve element 96 against the valve seat 106 in combination with the force provided by the springs 68 and 100, the valve stem and valve element 96 will be shifted to an open position. Then as the brake unit is more aggressively energized, a further build up of fluid pressure will take place behind the valve element 96 and the valve element will again shift toward the closed position. At the same time the spring 72 will undergo further compression so that the resistance or back pressure felt by the operator increases. As will be understood, the brake unit may be progressively energized in the manner described until the brake pedal has been fully depressed. In order to release the brakes, it is merely necessary to release the pressure on the foot pedal 112 so as to enable the spring 68 to raise the valve stem 48 from the valve element 96 and thereby connect the brake cylinder with the exhaust port.

While the preferred embodiment of the present invention has been shown and described herein, it is obvious that many structural details may be changed without departing from the spirit and scope of the appended claims.

The invention is claimed as follows:

1. A control valve comprising body means having axially extending bore means therein, inlet and exhaust ports communicating with axially spaced portions of said bore means, an intermediate outlet port communicating with said bore means between said inlet and exhaust ports, a first annular valve seat disposed between said inlet and outlet ports and defining a passageway between said inlet and outlet ports, a first valve element between said inlet port and said seat and shiftable axially with said bore means to and from a closed position against said valve seat and an opened position selectively for establishing and interrupting communication between said inlet port and said outlet port through said valve seat, said valve element having a first end portion engageable with said seat and an opposite end defining an end of a chamber within said body means, said first end portion presenting a second valve seat, passageway means disposed for establishing communication between said inlet port and said chamber only when said first valve element is in its opened position, a second valve element axially shiftable within the bore means and relative to said first valve element and engageable with said second valve seat selectively for establishing and interrupting communication between said outlet port and said exhaust port, and means connected with said second valve element for actuating said second valve element for movement into engagement with said second seat for blocking flow of fluid to said exhaust port and for then shifting said first valve element to its open position and subsequently enabling the first valve element to return to its closed position in response to a buildup of fluid pressure in said chamber while providing a manually detectable force in accordance with such fluid pressure for informing an operator as to the extent to which the valve has been operated.

2. A control valve, as defined in claim 1, wherein said means for actuating said second valve element comprises an actuating member, and a yieldable spring element between said actuating member and said second valve element.

3. A control valve, as defined in claim 1, which includes spring means engageable with said first valve element for urging said first valve element toward its closed position, and additional spring means engaging and biasing said second valve element toward its open position.

References Cited in the file of this patent
UNITED STATES PATENTS

| 2,267,726 | Frank et al. | Dec. 30, 1941 |
| 2,380,663 | Middleton | July 31, 1945 |
| 2,597,598 | Robison | May 20, 1952 |
| 2,854,289 | Schnell | Sept. 30, 1958 |

FOREIGN PATENTS

| 633,979 | France | Oct. 31, 1927 |

UNITED STATES PATENT OFFICE
CERTIFICATE OF CORRECTION

Patent No. 3,050,344             August 21, 1962

Osborn A. Kershner

It is hereby certified that error appears in the above numbered patent requiring correction and that the said Letters Patent should read as corrected below.

Column 2, line 35, for "bewteen" read -- between --; column 5, line 39, for "with" read -- within --.

Signed and sealed this 8th day of January 1963.

(SEAL)
Attest:

ERNEST W. SWIDER
Attesting Officer

DAVID L. LADD
Commissioner of Patents